United States Patent [19]

Mankovitz

[11] Patent Number: 5,512,963
[45] Date of Patent: Apr. 30, 1996

[54] APPARATUS AND METHODS FOR PROVIDING COMBINING MULTIPLE VIDEO SOURCES

[76] Inventor: Roy J. Mankovitz, 18057 Medley Dr., Encino, Calif. 91316

[21] Appl. No.: 369,532

[22] Filed: Jan. 5, 1995

[51] Int. Cl.[6] ................................. H04N 5/44
[52] U.S. Cl. ..................... 348/725; 348/705; 455/6.2
[58] Field of Search .................. 348/6, 8, 705, 348/706, 725, 659; 455/3.1, 3.2, 4.2, 6.2, 6.3, 188.1, 191.1; 358/86; H04N 9/67, 5/38, 5/44, 5/268

[56] References Cited

U.S. PATENT DOCUMENTS

| | | | |
|---|---|---|---|
| 3,639,686 | 2/1972 | Walker et al. | 178/5.8 R |
| 3,729,581 | 4/1973 | Anderson | 178/6.8 |
| 3,730,980 | 5/1973 | Kirk, Jr. | 178/5.1 |
| 3,733,431 | 5/1973 | Kirk, Jr. et al. | 178/5.1 |
| 3,859,457 | 1/1975 | Kirk, Jr. | 178/5.1 |
| 3,882,266 | 5/1975 | Walding | 178/5.1 |
| 3,898,375 | 8/1975 | Hannan et al. | 178/5.1 |
| 3,982,062 | 9/1976 | Simons | 178/5.1 |
| 4,085,422 | 4/1978 | Niwata et al. | 358/118 |
| 4,139,865 | 2/1979 | Iida et al. | 358/188 |
| 4,173,024 | 10/1979 | Miller | 358/115 |
| 4,272,791 | 6/1981 | Rifken | 360/33 |
| 4,276,562 | 6/1981 | Stewart et al. | 358/86 |
| 4,316,217 | 2/1982 | Rifken | 358/86 |
| 4,333,109 | 6/1982 | Ciciora | 358/147 |
| 4,496,986 | 1/1985 | Lubchenko et al. | 358/114 |
| 4,518,993 | 5/1985 | Okada et al. | 358/114 |
| 4,611,242 | 9/1986 | Williams | 358/123 |
| 4,630,313 | 12/1986 | Damoci | 455/2 |
| 4,677,686 | 6/1987 | Hustig et al. | 455/5 |
| 4,706,121 | 11/1987 | Young | 358/142 |
| 4,771,456 | 9/1988 | Martin et al. | 380/10 |
| 4,783,846 | 11/1988 | Wachob | 455/151 |
| 4,914,517 | 4/1990 | Duffield | 358/191.1 |
| 4,926,477 | 5/1990 | Paik | 380/15 |
| 4,941,048 | 7/1990 | Hartson et al. | 358/181 |
| 4,977,455 | 12/1990 | Young | 358/142 |
| 4,985,772 | 1/1991 | Long et al. | 358/181 |
| 4,996,597 | 2/1991 | Duffield | 358/181 |
| 5,216,499 | 6/1993 | Berkheimer | 358/86 |
| 5,251,035 | 10/1993 | Kurita et al. | 358/188 |
| 5,296,932 | 3/1994 | Long | 348/731 |
| 5,353,121 | 10/1994 | Young et al. | 348/563 |
| 5,374,961 | 12/1994 | Jung | 348/468 |

*Primary Examiner*—Victor R. Kostak
*Assistant Examiner*—Juan Gabriel Acosta
*Attorney, Agent, or Firm*—Christie, Parker & Hale

[57] ABSTRACT

Apparatus and methods are provided for connecting video components. In one embodiment the apparatus includes a notch filter for filtering frequencies of a first channel from a first video source, the first video source having a plurality of channels, to form a notch filter output having each of the plurality of channels except the frequencies of the first channel, a bandpass filter for filtering a second video source to pass only frequencies in a second channel in the second video source having the same frequencies as the frequencies of the first channel to form a bandpass filter output, and a summer for summing the notch filter output and the bandpass filter output to form a summed output. In another embodiment the apparatus includes a signal splitter for splitting a first input signal and providing a first and second output, the second output coupled to and providing the first video source into the notch filter.

27 Claims, 17 Drawing Sheets

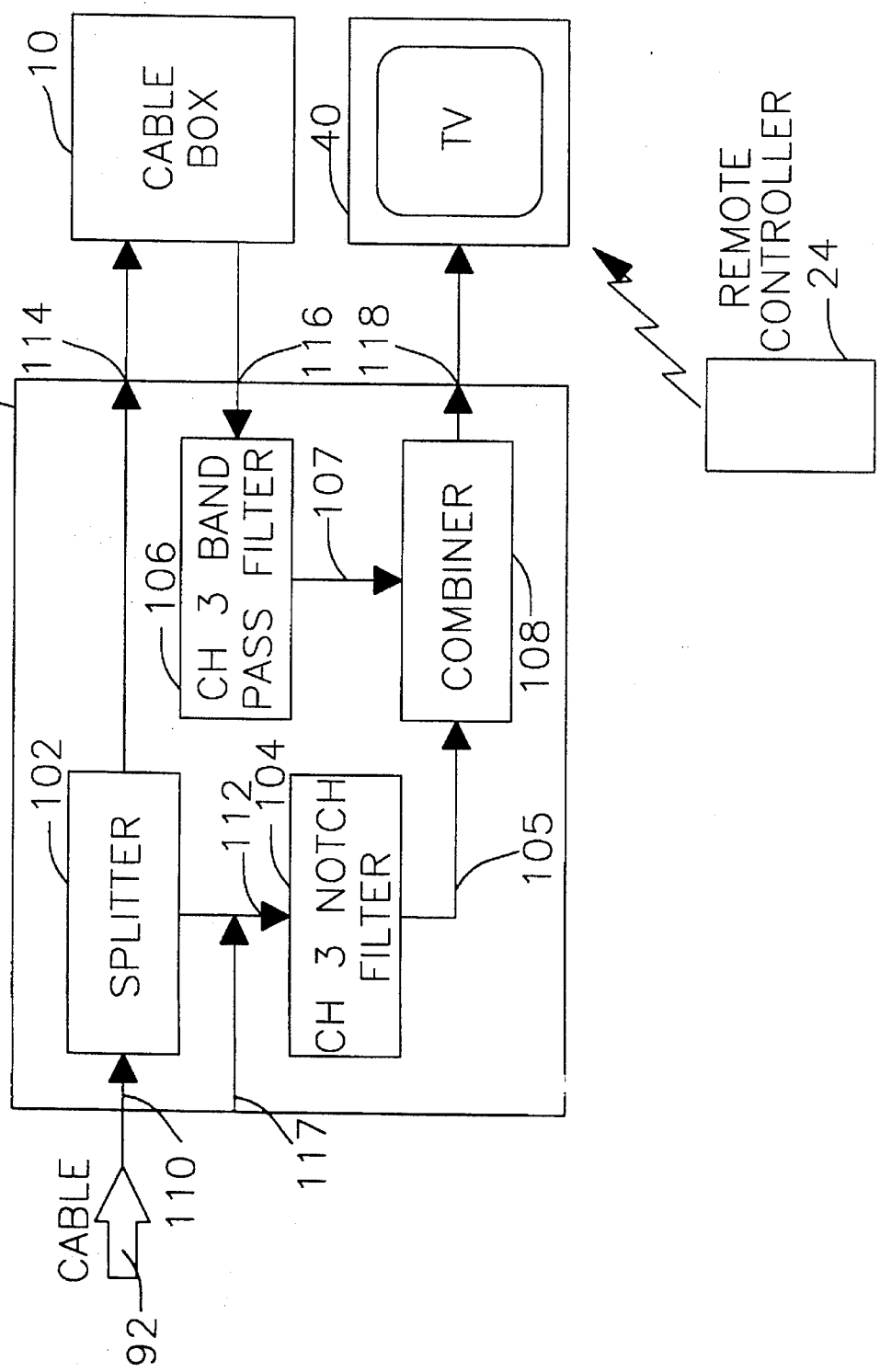

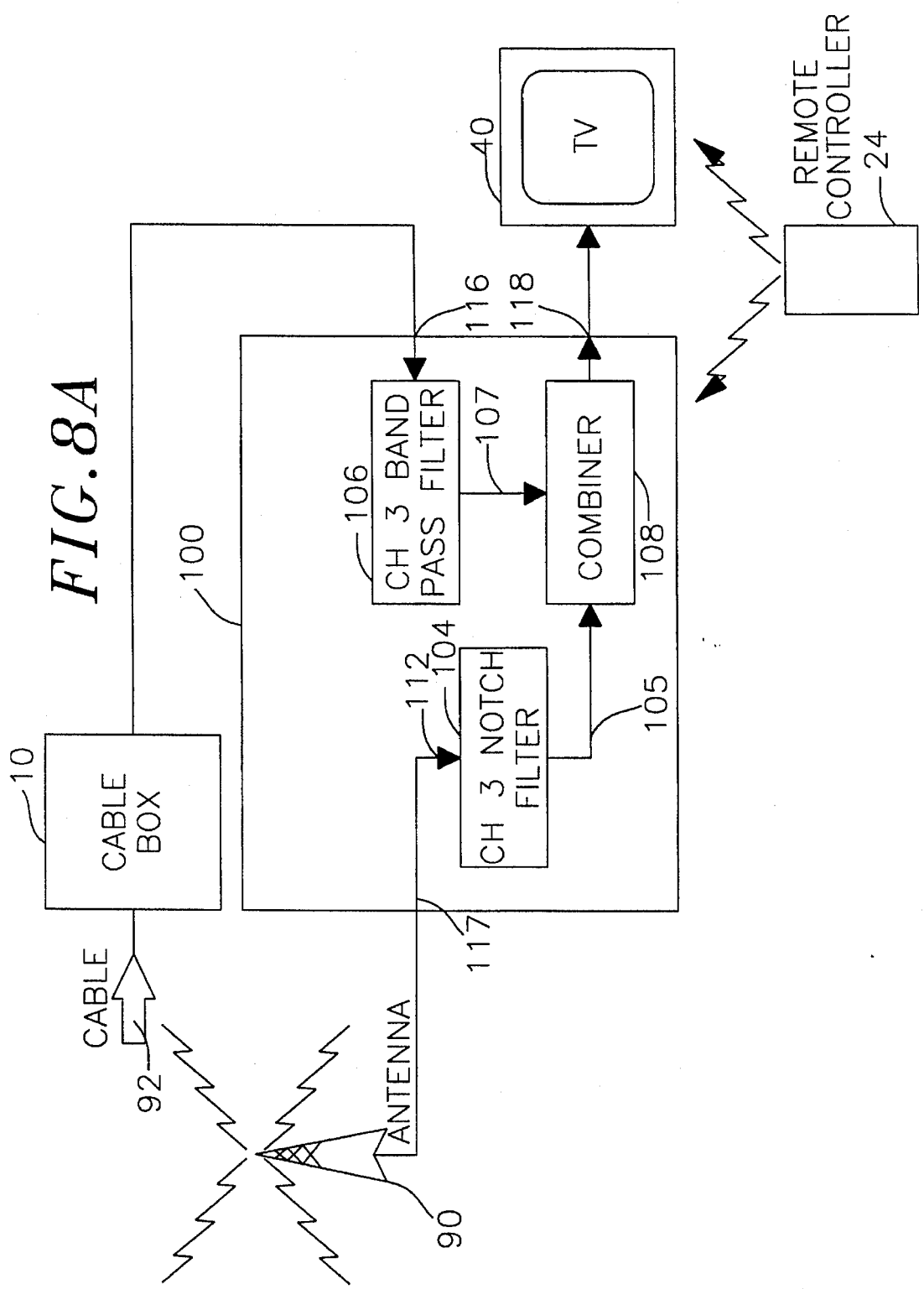

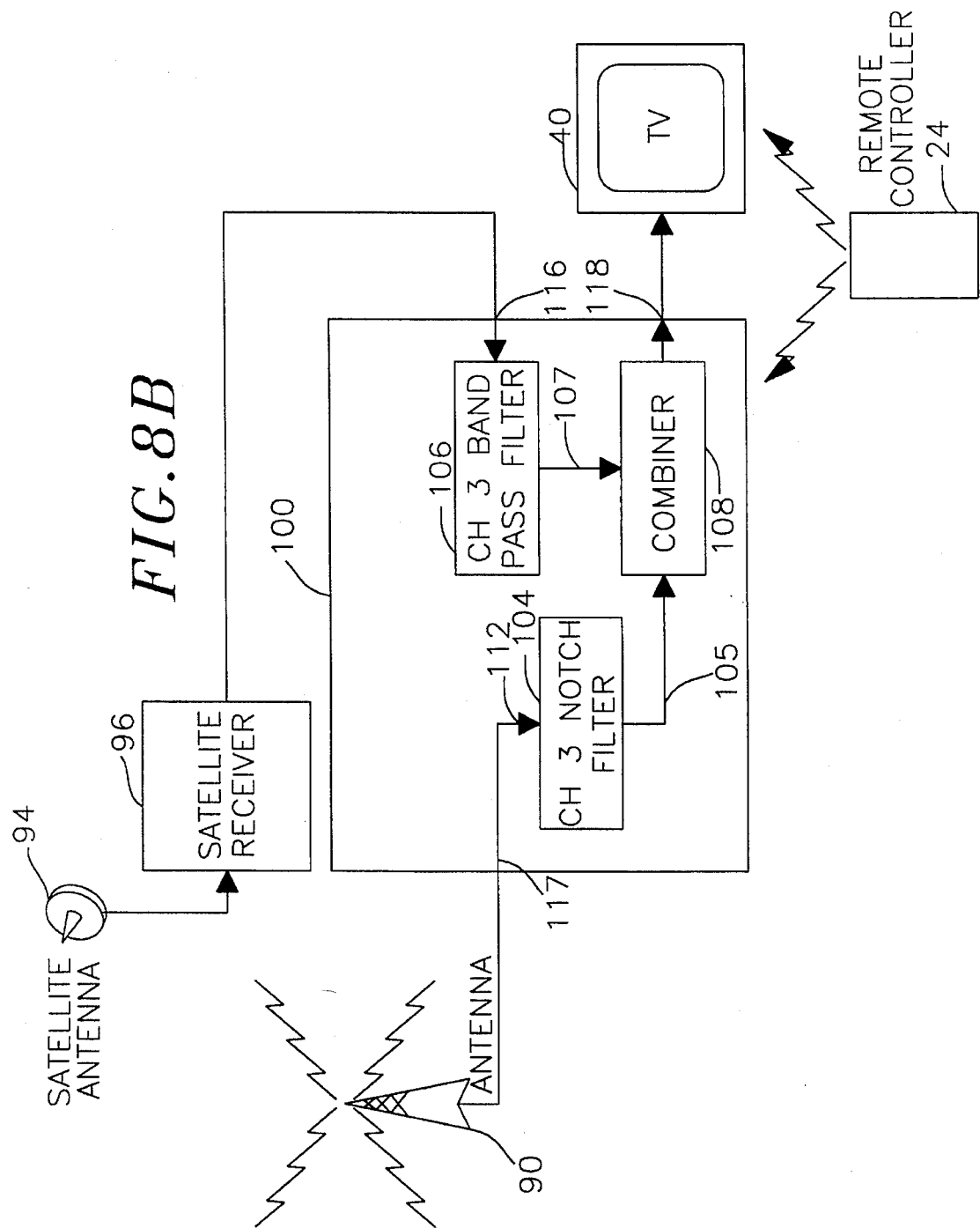

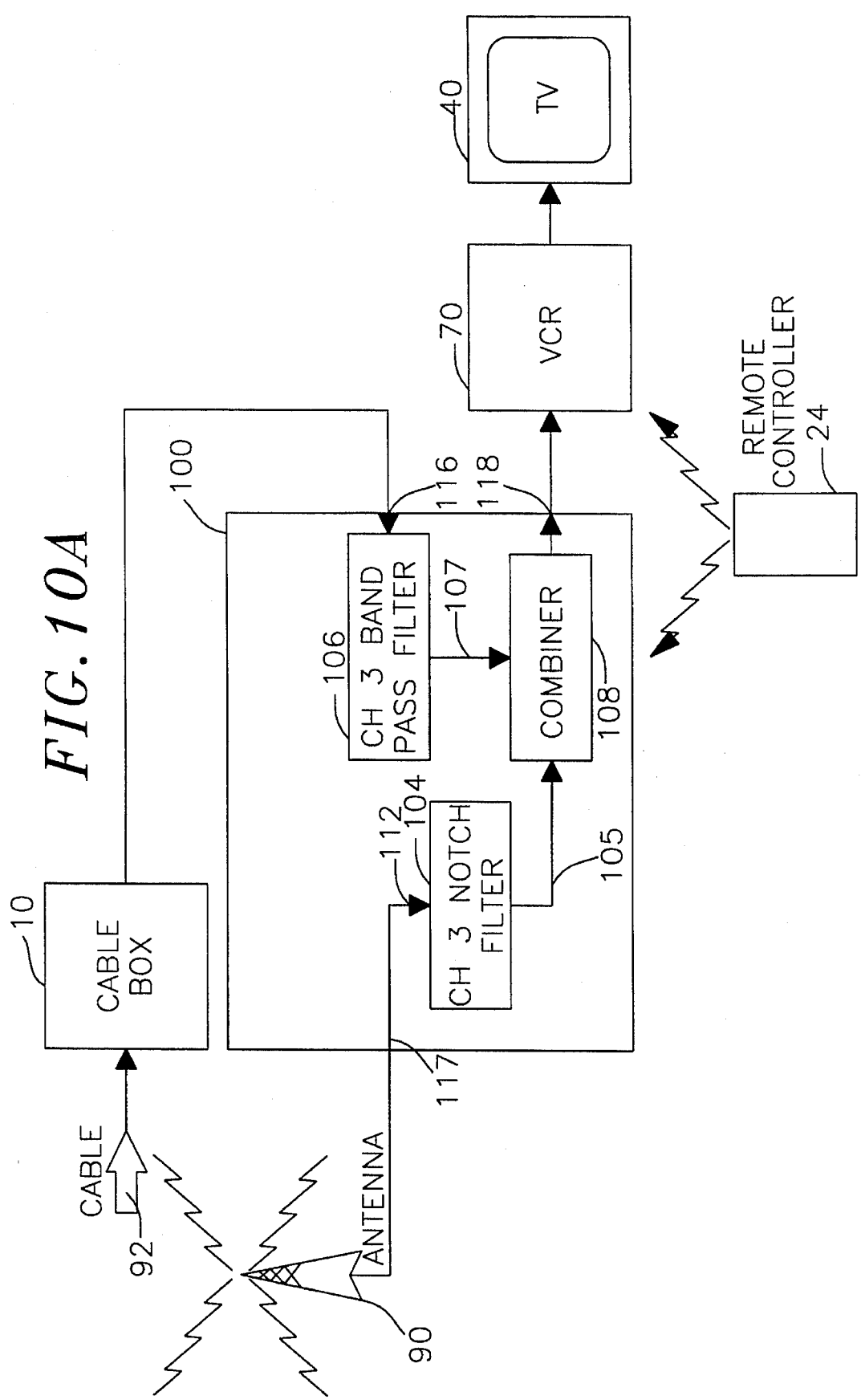

5,512,963

APPARATUS AND METHODS FOR PROVIDING COMBINING MULTIPLE VIDEO SOURCES

FIELD OF THE INVENTION

This invention relates in general to television systems and in particular to an apparatus for connecting video components, such as televisions, video cassette recorders, cable boxes and satellite receivers, together.

BACKGROUND OF THE INVENTION

In video systems that include a television, cable box, and video cassette recorder, a user may wish to watch one cable channel while recording another cable channel. Many televisions are now designed to be cable ready. By using a switch called an A/B switch, a user can attach the television either directly to the cable or to the output of the video cassette recorder, which is connected to the output of the cable box. This gives the user the capability of recording one cable channel and viewing another cable channel on the television. For example, an unscrambled channel on cable can be viewed on the television while a VCR records a scrambled channel that is unscrambled by the cable box.

The A/B switch solves the problem of watching one channel on television while recording another channel on a VCR; however, the A/B switch is a manual switch and the user must physically operate the A/B switch. The user would prefer to use a remote controller to control the video system to be able to view one channel while recording another.

Another problem is that when a cable box is used, only one channel is tuned at any one time to appear on the channel 3 output of the cable box. Thus for users without an A/B switch, it is only possible to view and or record one channel at a time. Thus a user is not able to record on channel 30 while viewing a program on channel 24, for example.

Another problem is that if an over-the-air antenna and a cable or a satellite receiver are both used for reception, then it would be desirable to be able to record a channel from either source while viewing a channel from either source. An A/B switch does not provide this capability and in any event requires manual switching.

SUMMARY OF THE INVENTION

According to the invention, apparatus and methods are provided for connecting video components. In one embodiment the apparatus includes a notch filter for filtering frequencies of a first channel from a first video source, the first video source having a plurality of channels, to form a notch filter output having each of the plurality of channels except the frequencies of the first channel, a bandpass filter for filtering a second video source to pass only frequencies in a second channel in the second video source having the same frequencies as the frequencies of the first channel to form a bandpass filter output, and a summer for summing the notch filter output and the bandpass filter output to form a summed output. In another embodiment the apparatus includes a signal splitter for splitting a first input signal and providing a first and second output, the second output coupled to and providing the first video source into the notch filter.

Many of the attendant features of this invention will be more readily appreciated as the same becomes better understood by reference to the following detailed descriptions and considered in connection with the accompanying drawings in which like reference symbols designate like parts throughout the figures.

BRIEF DESCRIPTION OF THE DRAWINGS

FIG. 7 illustrates using the apparatus for connecting video components to connect a cable, a cable box and a television according to the present invention;

FIG. 8A illustrates using the apparatus for connecting video components to connect an over-the-air antenna, a cable box, and a television according to the present invention;

FIG. 8B illustrates using the apparatus for connecting video components to connect an over-the-air antenna, a satellite receiver, and a television according to the present invention;

FIGS. 10A and 10B illustrate configurations for using the apparatus for connecting video components to connect an over-the-air antenna, a VCR, a television, and a cable box or a satellite receiver, respectively, according the present invention;

DETAILED DESCRIPTION

Figure 1A:
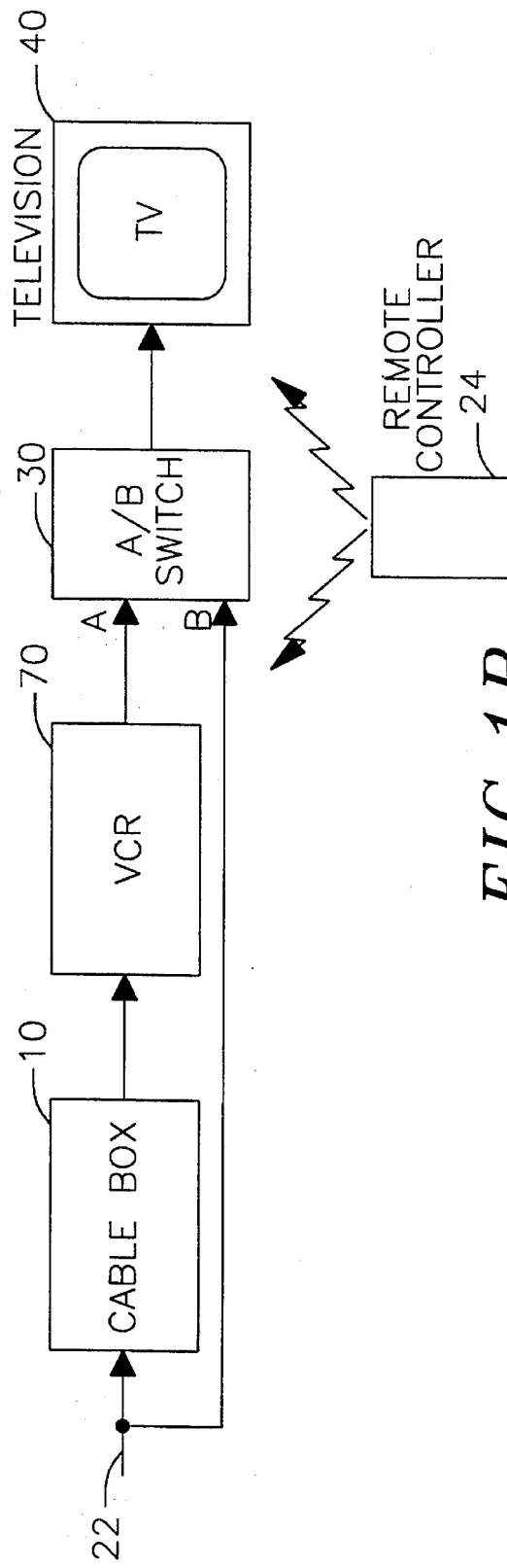
FIG. 1A is a block diagram showing an A/B switch connecting together video components according to the prior art.
Figure 1B:
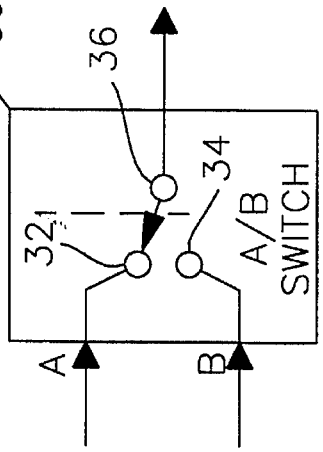
FIG. 1B is a diagram illustrating an A/B switch according to the prior art.

Referring now to the drawings, FIG. 1A shows the typical use of an A/B switch for connecting together a video system consisting of a cable box, a video cassette recorder, and a television. An A/B switch allows the VCR 70 to be used to record a channel received via cable 22 and descrambled by cable box 10 while the viewer views another cable channel. The cable box 10 output is connected to the input of the VCR 70. The output of the VCR 70 is connected to the A input of the A/B switch 30. The cable 22 is coupled directly to the B input of A/B switch 30. FIG. 1 illustrates the internal design of an A/B switch 30. The A/B switch 30 is merely a two position switch. The output of the A/B switch 36 is connected via the switch to either the A input 32 or the B input 34. As shown in FIG. 1A the output of the A/B switch is connected to television 40. The user can manually switch A/B switch 30 to either receive channels directly from cable 22 via the B input of the A/B switch or receive channels via the output of the VCR 70. The A/B switch is particularly useful if the VCR 70 is being used to record a program.

Figure 1C:
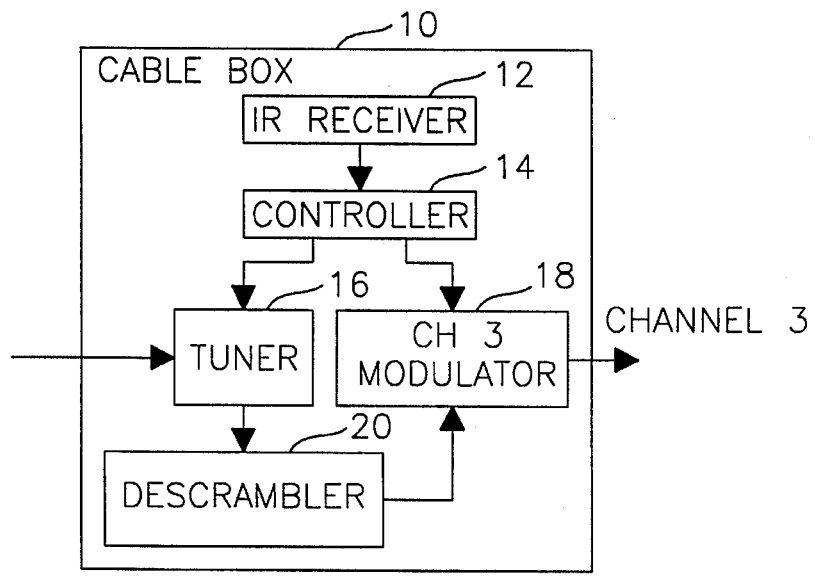
FIG. 1C is a block diagram of a cable box according to the prior art.

As shown in FIG. 1C, a conventional cable box 10 has an infrared receiver 12, a controller 14, a tuner 16, a channel 3 modulator 18, and a descrambler 20. The infrared receiver can receive commands from a remote controller such as remote controller 24 shown in FIG. 1A. The commands sent to the cable box are interpreted by controller 14 and used to tune the tuner 16 to different channels on the input of the cable box. The descrambler 20 is used to descramble any channels that have been scrambled upon transmission. The channel selected by tuner 16 is modulated by channel 3 modulator 18 so that the selected channel appears on the channel 3 frequencies at the output of the cable box 10. Typically the cable box also has a switch so that the selected channel can be modulated to appear either on the channel 3 or the channel 4 frequencies at the output of the cable box. Throughout this specification, channel 3 will be used to describe the operation of the invention; however, it should be understood that channel 4 or some other channel could be used.

Figure 1D:
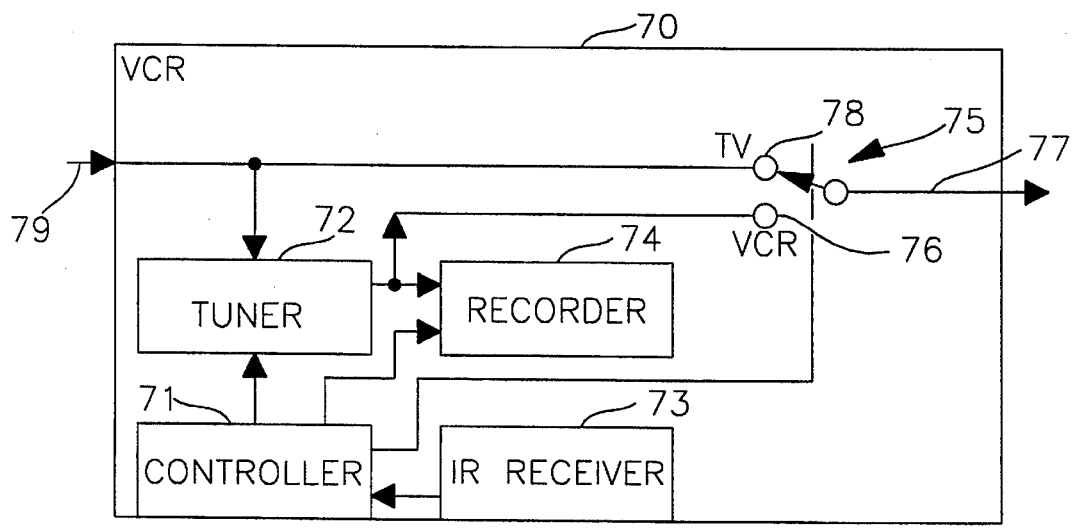
FIG. 1D is a block diagram of a VCR according to the prior art.

FIG. 1D is a block diagram of a conventional video cassette recorder. The video cassette recorder 70 includes a tuner 72, an infrared receiver 73, a controller 71, a recorder 74, and a switch 75. The infrared receiver 73 can receive commands from a remote controller such as remote controller 24 and the commands are interpreted by controller 71 which controls tuner 72 and recorder 74. The tuner 72 in a VCR can tune the input to the VCR to choose a channel for recording by the recorder 74, which includes read/write heads and control drives for a video cassette tape. Switch 75 in the VCR is a so-called VCR/TV switch and can be controlled via the remote controller to be either in the TV 78 or VCR 76 position. When in the TV 78 position, the output 77 of the VCR is connected directly to the input 79 of the VCR. When in the VCR 76 position, the switch 75 connects the output 77 to the output of tuner 72 or the output of recorder 74. When a video cassette tape is played in the VCR, then the output of recorder 74 supplies the output 77 through the VCR position 76 of switch 75. When the VCR is being used to record a program, then if the VCR is coupled directly to a cable, the tuner 72 can be used to select a channel for the recorder 74 to record. While the VCR is recording that channel the switch 75 can be switched to the TV 78 position so that the cable input to the VCR 70 is sent directly to a television and the tuner in the television is used to select a cable channel for viewing. However, if the VCR 70 is used as shown in FIG. 1A, then if the cable box is used to tune to a particular channel which needs to be descrambled for the VCR to record it, the tuner 72 must be tuned to channel 3 in order to receive the channel from the cable box 10. In this case, switching the switch 75 to TV position 78 while the VCR is recording the program will only allow the viewer of the television to watch the same program that is being recorded. This is the reason for the A/B switch 30 in FIG. 1A, which allows the viewer of television 40 to switch to the B position so that any of the channels on the cable 22 can be viewed. However, if a channel selected by a tuner in television 40 is a scrambled channel, then the viewer will only see a scrambled signal. Therefore, the viewer must select a nonscrambled channel to view.

Figure 1E:
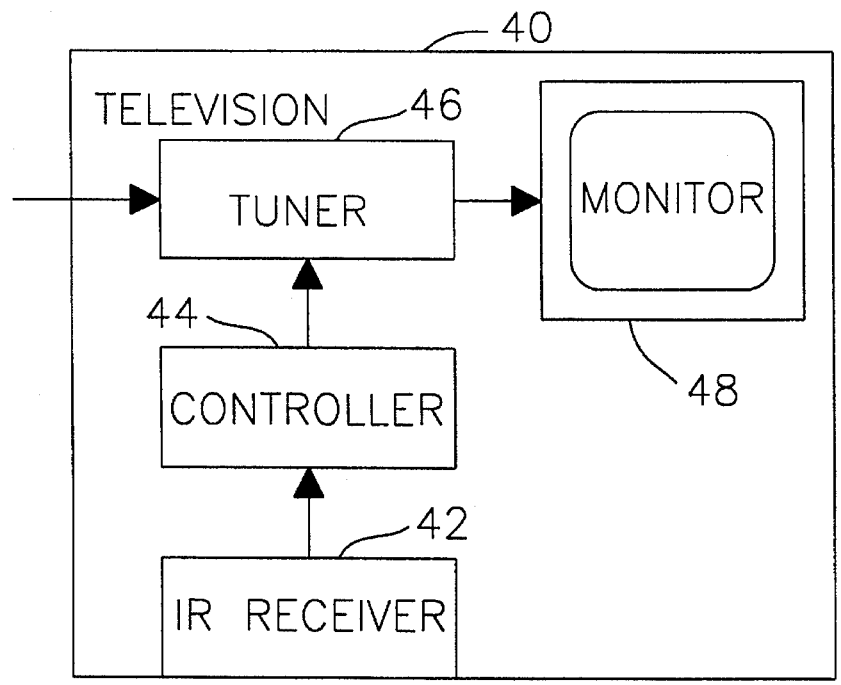
FIG. 1E is a block diagram of a television according to the prior art.

FIG. 1E illustrates a conventional television 40, which has an infrared receiver 42, a controller 44, a tuner 46, and a monitor 48. The infrared receiver 42 can receive commands from a remote controller such as remote controller 24 of FIG. 1F. The tuner can be used to tune the television to various channels. When the television tuner 46 is coupled to the output of cable box 10, the tuner is tuned to channel 3 in order to receive whatever the channel the cable box has modulated onto channel 3. When the tuner 46 is coupled to the output of recorder 74 or tuner 72 in VCR 70, then because the tuner 72 demodulates the input of the VCR to channel 3 for recording, and because the recorder output is tuned to channel 3, the tuner 46 must also be tuned to channel 3. If the raw cable input is sent, for instance via position B of A/B switch 30, to the tuner 46, then the tuner 46 can be tuned to any of the channels from cable 22.

A satellite receiver is not shown in the figures; however, the block diagram of a satellite receiver is very similar to the block diagram of cable box 10. The output of a satellite receiver is also typically modulated to channel 3 or channel 4.

Figure 1F:
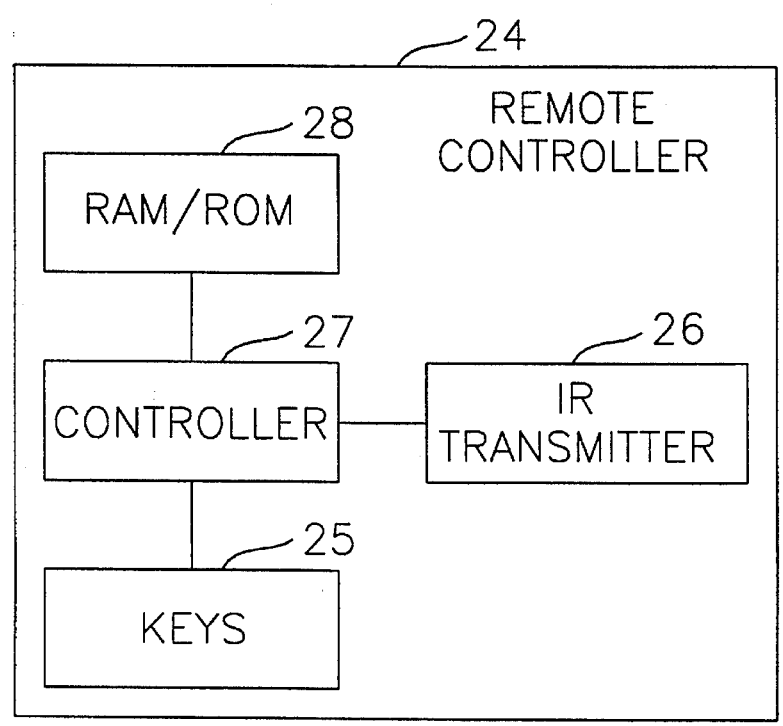
FIG. 1F is a block diagram of a remote controller according to the prior art.

FIG. 1F illustrates a conventional remote controller which includes keys 25, a controller 27, a memory 28, which can be a combination of RAM and ROM, and an infrared transmitter 26. As is well known in the art, the remote controller 24 can be a universal remote controller.

Figure 2A:
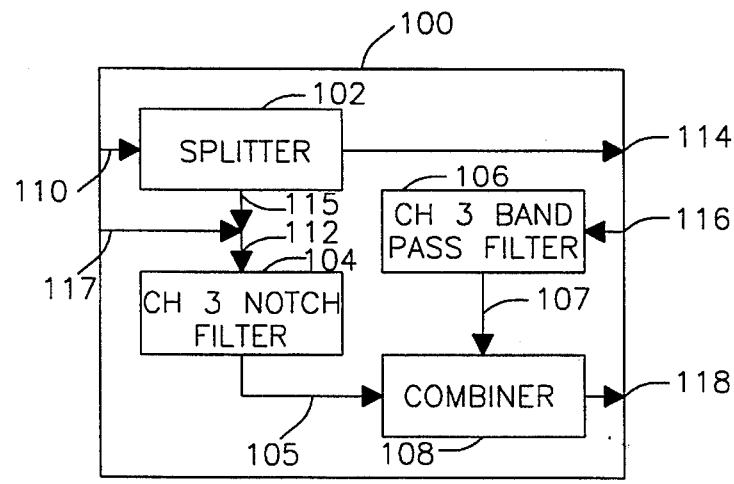
FIG. 2A is a block diagram of an apparatus for connecting video components according to the present invention.

To this point the conventional apparatus for connecting video components has been described. FIG. 2A is a block diagram of an apparatus for connecting video components according to the present invention. In a first embodiment of the apparatus, the apparatus contains a channel 3 notch filter 104 (if a cable box uses channel 4, then this would be a channel 4 notch filter) which has an input 112 and an output 105. The apparatus also has a channel 3 bandpass filter 106 with an input 116 and an output 107. The signal at the output 105 of the notch filter 104 and the signal at the output 107 of the bandpass filter 106 are combined by combiner 108 to produce a signal summed on output 118. The channel 3 notch filter 104 filters channel 3 frequencies from the signal at input 112 so that the signal at the output 105 does not contain channel 3 frequencies. The channel 3 bandpass filter 106 passes only frequencies in channel 3 from the signal at input 116 to the output 107. Other frequencies are filtered from the signal at input 116 and do not appear at the output 107. (If the channel 3 notch filter is a channel 4 notch filter, then the channel 3 bandpass filter is a channel 4 bandpass filter.) Because the signal at the output 105 does not contain channel 3 frequencies and the signal at output 107 contains only channel 3 frequencies, the combiner 108 can be used to sum together the outputs 105 and 107 to form a summed signal at output 118 which contains all the frequencies available at output 105 and 107.

In another embodiment of the apparatus for connecting video components, a splitter 102 has an input 110 and an output 114 and another output, 115 connected to the input 112 of the channel 3 notch filter 104. The splitter 102 can be an external component or packaged together with the apparatus for connecting video components.

Figure 2B:
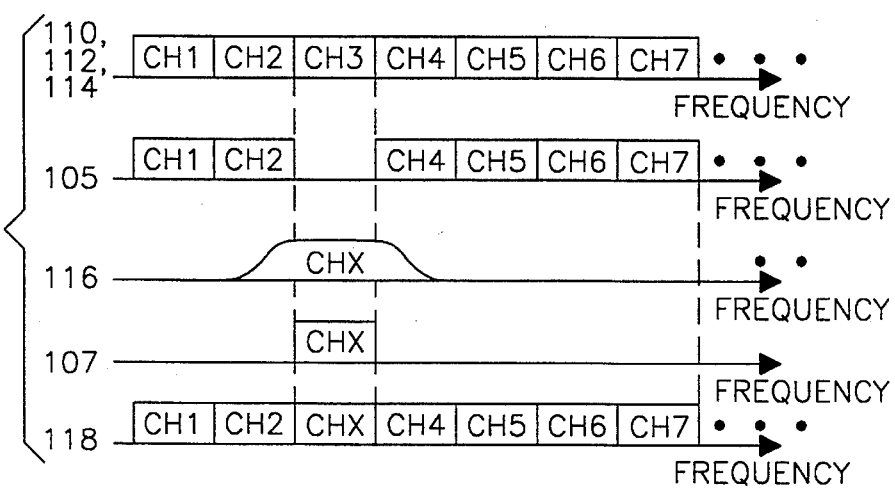
FIG. 2B is a frequency diagram illustrating the operation of the apparatus for connecting video components according to the present invention.

FIG. 2B is a frequency diagram illustrating the relationship of the various inputs and outputs of the apparatus for connecting video components shown in FIG. 2A. The top frequency diagram of FIG. 2B illustrates the signal at input 110, input 112, and output 114 (without the splitter 102) which typically contains a plurality of channels such as channel 1, channel 2, channel 3, channel 4, channel 5, channel 6, channel 7, and so on. The output signals of splitter 102 are the same; however, the splitter provides some isolation between its two outputs. The input signal to channel 3 notch filter 104 can also come directly to input 112 from line 117 and in that case the splitter 102 is not used. The frequency diagram of FIG. 2B that is labeled 105 illustrates the frequencies present in the signal at output 105 after the channel 3 notch filter 104 has filtered the channel 3 frequencies from the signal at input 112. The frequency diagram of FIG. 2B labeled 116 illustrates the typical input signal on input 116 of FIG. 2A. As will be described, the signal at input 116 is typically sourced by either a cable box, a satellite receiver, or a video cassette recorder, all of which have output signals having channel 3 frequencies. (As discussed above, channel 4 frequencies can be used instead.) However, the output of cable boxes, VCRs, and satellite receivers do not have a sharp cutoff on either side of the channel 3 frequencies.. As shown in FIG. 2B, the signal at input 116 is primarily centered on channel 3 frequencies, but overlaps into channel 2 and channel 4 frequencies. The purpose of the channel 3 bandpass filter 106 is to remove the unwanted frequencies from the signal at input 116 that are overlapping channels 2 and 4. Thus, as shown in FIG. 2B, the frequency diagram labeled 107 has a sharp frequency response that contains only channel 3 frequencies. The summed signal at output 118 as shown in FIG. 2B contains the frequencies of the signal at output 105 and the frequencies of the signal at output 107. The summed signal at output 118 contains channel 1, channel 2, channel X, channel 4, channel 5, channel 6, channel 7, and so on. The channel X is centered at the frequencies of channel 3 and is typically a channel that has been tuned to via a cable box, a video cassette recorder, or a satellite receiver, and modulated to channel 3 frequencies.

Figure 3:
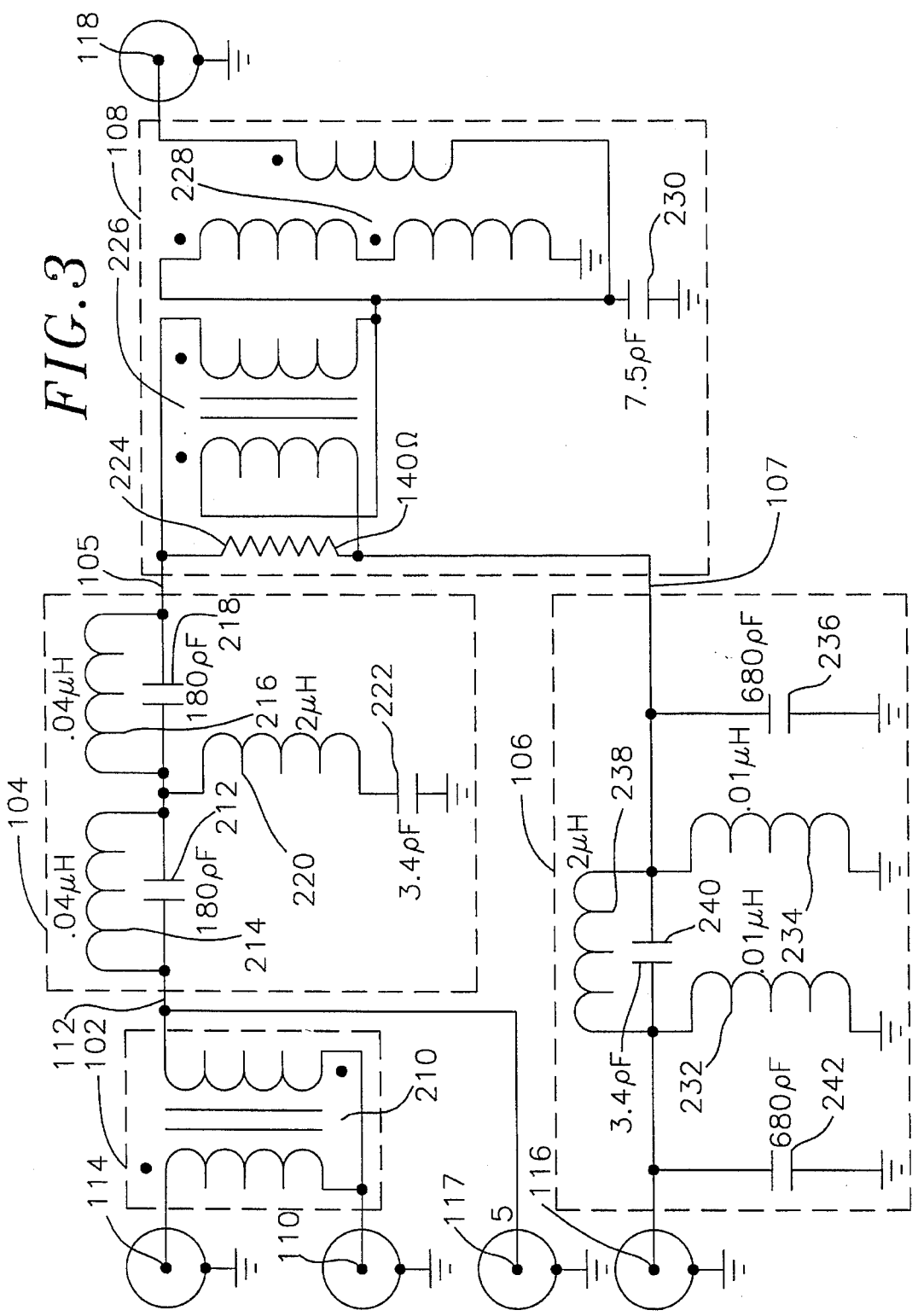
FIG. 3 is a circuit diagram of the apparatus for connecting video components according to the present invention.

FIG. 3 is a circuit diagram of the apparatus for connecting video components according to the present invention. The splitter 102 is implemented by transformer 210. The channels 3 notch filter 104 is implemented with inductors 214, 216, and 220 and capacitors 212, 218, and 222. The values of the inductors and capacitors are as shown on FIG. 3. The channel 3 bandpass filter 106 is implemented by capacitors 242, 240 and 236 and inductors 238, 232, and 234. The combiner 108 is implemented with resistor 224, transformer 226, transformer 228, and capacitor 230. The circuit components in the apparatus for connecting video components, as shown in FIG. 3, are all passive circuit components, which are relatively inexpensive.

Figure 2C:
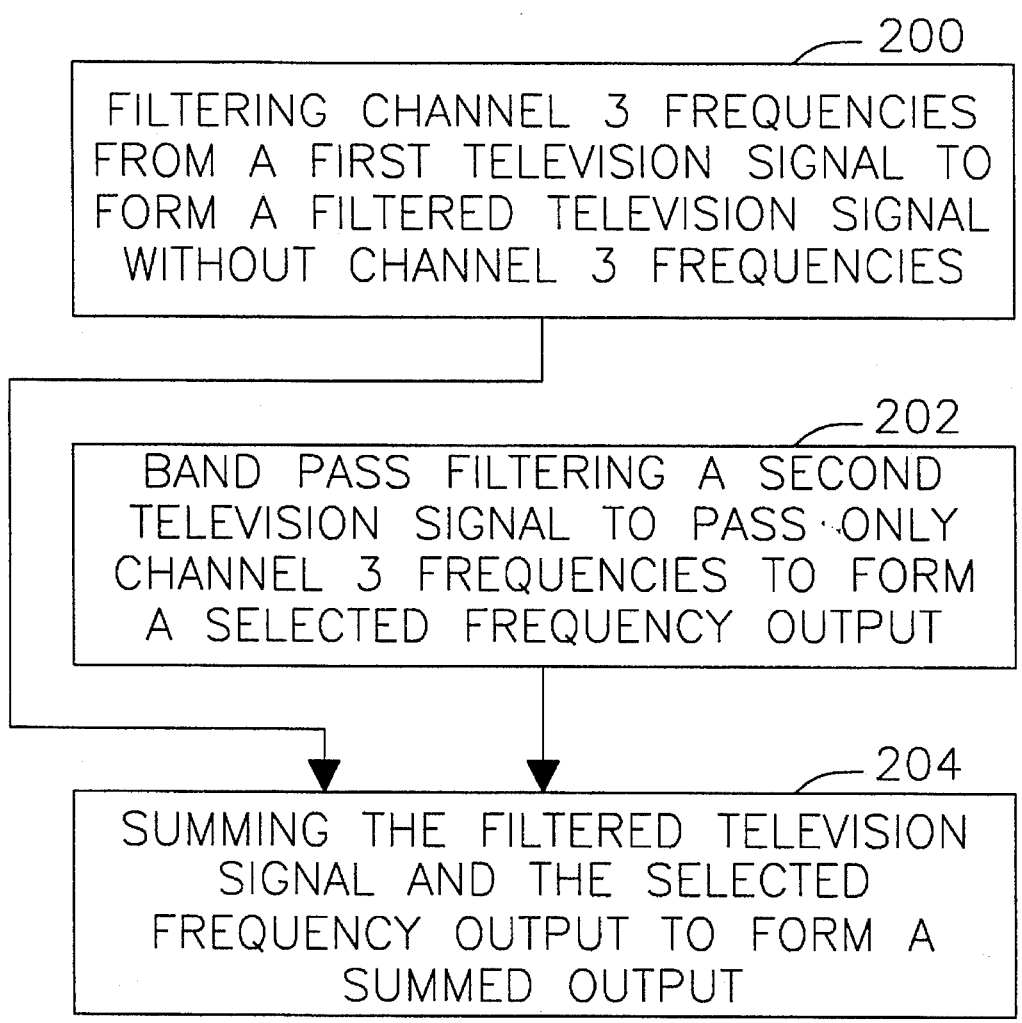
FIG. 2C is a flow diagram of a method for connecting video component signals according to the present invention.

FIG. 2C is a flow diagram of a method for connecting video component signals according to the present invention. In step 200, channel 3 frequencies are filtered from a first television signal to form a filtered television signal without channel 3 frequencies. In step 202 a second television signal is bandpass filtered to pass only channel 3 frequencies to form a selected frequency output. Then in step 204 the filtered television signal and the selected frequency output are summed together to form a summed output.

Figure 4:
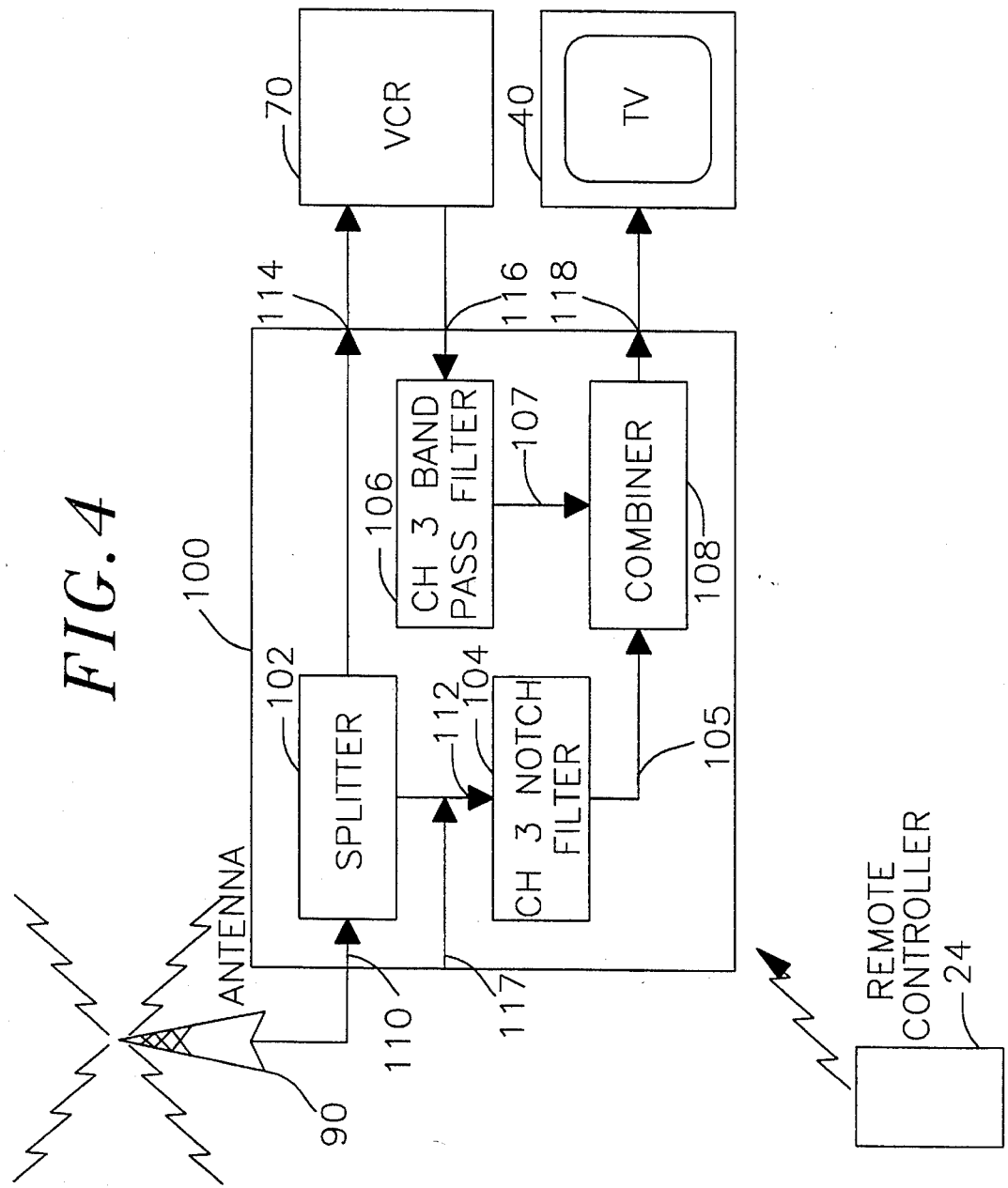
FIG. 4 is a diagram illustrating the apparatus for connecting video components being used to connect an over-the-air antenna with a VCR and a television according to the present invention.

FIGS. 4 through 11B illustrate different configurations of video components connected with the apparatus for connecting video components according to the present invention. In FIG. 4 an over-the-air antenna 90 is connected to input 110. A VCR 70 has an input from output 114 and sends its output signal to input 116. A television 40 is connected to summed output 118. The over-the-air channels received via the antenna are output via splitter 102 to both channel 3 notch filter 104 and to the input of VCR 70. The channel 3 notch filter 104 removes the channel 3 frequencies from the over-the-air signals. The output of VCR 70 is modulated to channel 3 and the channel 3 bandpass filter, as described above, filters any other frequencies besides channel 3 frequencies from the VCR output. The output of the channel 3 notch filter 104 and the channel 3 bandpass filter 106 are combined by combiner 108 and the summed signals at output 118 is sent to the TV. A remote controller 24 can be used to control the VCR 70 and the television 40. With the configuration of FIG. 4, the user can view any of the over-the-air channels except channel 3 on the television, while recording any of the over-the-air channels on VCR 70. The viewer can also switch between a program being played by VCR 70 and over-the-air channels received by antenna 90. Note that this is a significant improvement over the state of the art represented by FIG. 1A. In FIG. 1A if the user wishes to switch between a program being played by VCR 70 and other channels being received by cable, then the user must manually switch the A/B switch 30. Note that the B input to the A/B switch 30 could be an over-the-air antenna. In the configuration shown in FIG. 4, the user need not manually switch any switch. The user can control all operations of the video components via commands sent to the video components via the remote controller 24. Note that the VCR 70 can record any of the over-the-air channels by using the tuner 72 built into the VCR 70.

Figure 5:
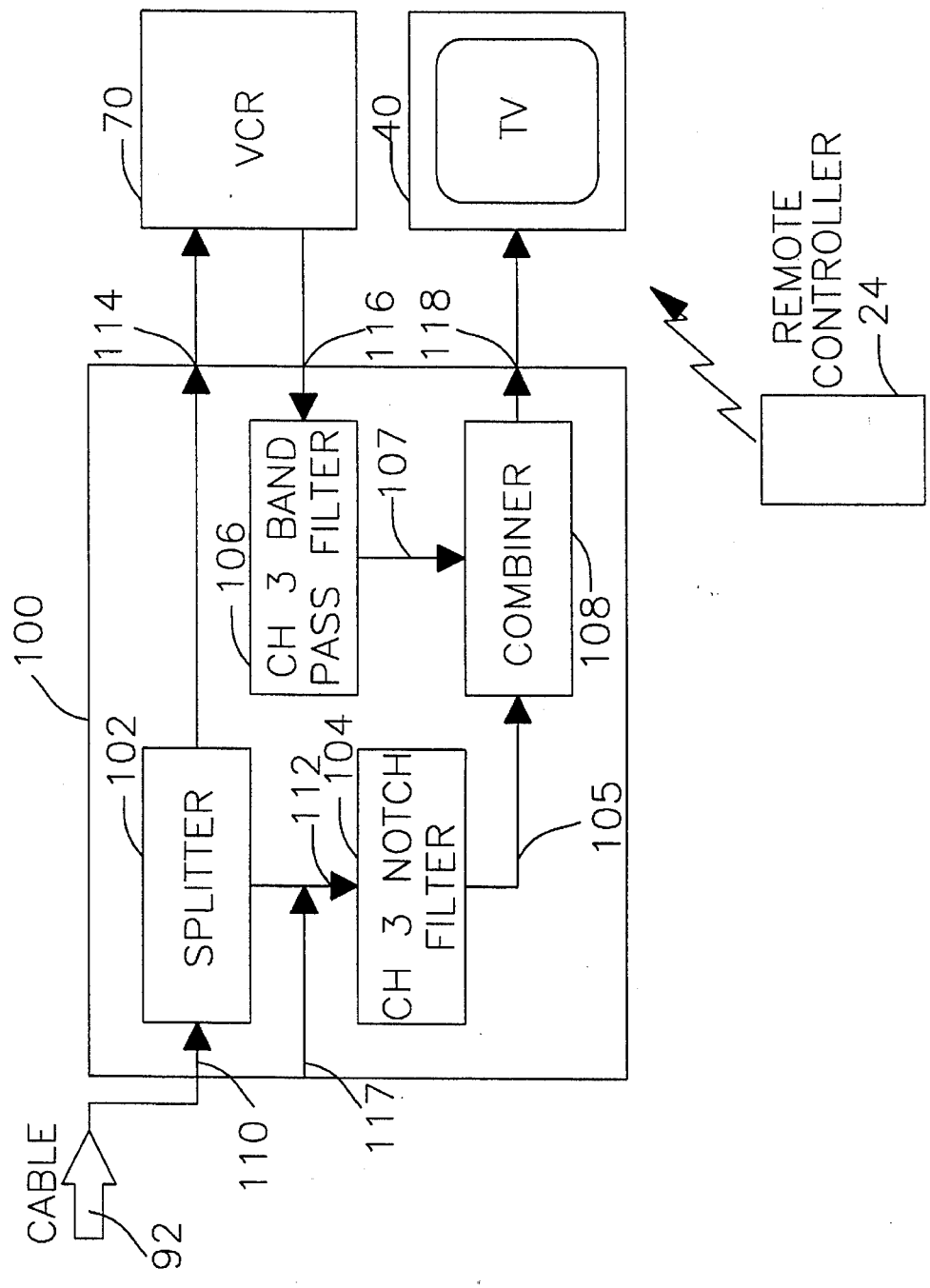
FIG. 5 is a diagram illustrating the apparatus for connecting video components being used to connect a cable, a VCR and a television according to the present invention.

The configuration shown in FIG. 5 for using the apparatus for connecting video components is analogous to FIG. 4, except that in FIG. 5 television cable 92 replaces the antenna 90. The operation of the configuration of FIG. 5 is similar to the operation of the configuration of FIG. 4. The VCR 70 can record any of the channels on cable 92 and the viewer can view any of the cable channels except cable channel 3; however, the viewer can also view on channel 3 a program being played by VCR 70. Note that in the configuration of FIG. 5 channel 3 on cable 92 can be viewed by tuning the VCR to channel 3 and outputting that channel to input 116. Then the channel 3 bandpass filter passes channel 3 and by tuning tuner 46 in television 40 to channel 3, the viewer can view channel 3 on cable 92. Thus the user via remote controller 24 can view all of the cable channels and also avoid the necessity of manually switching an A/B switch 30.

Figure 6:
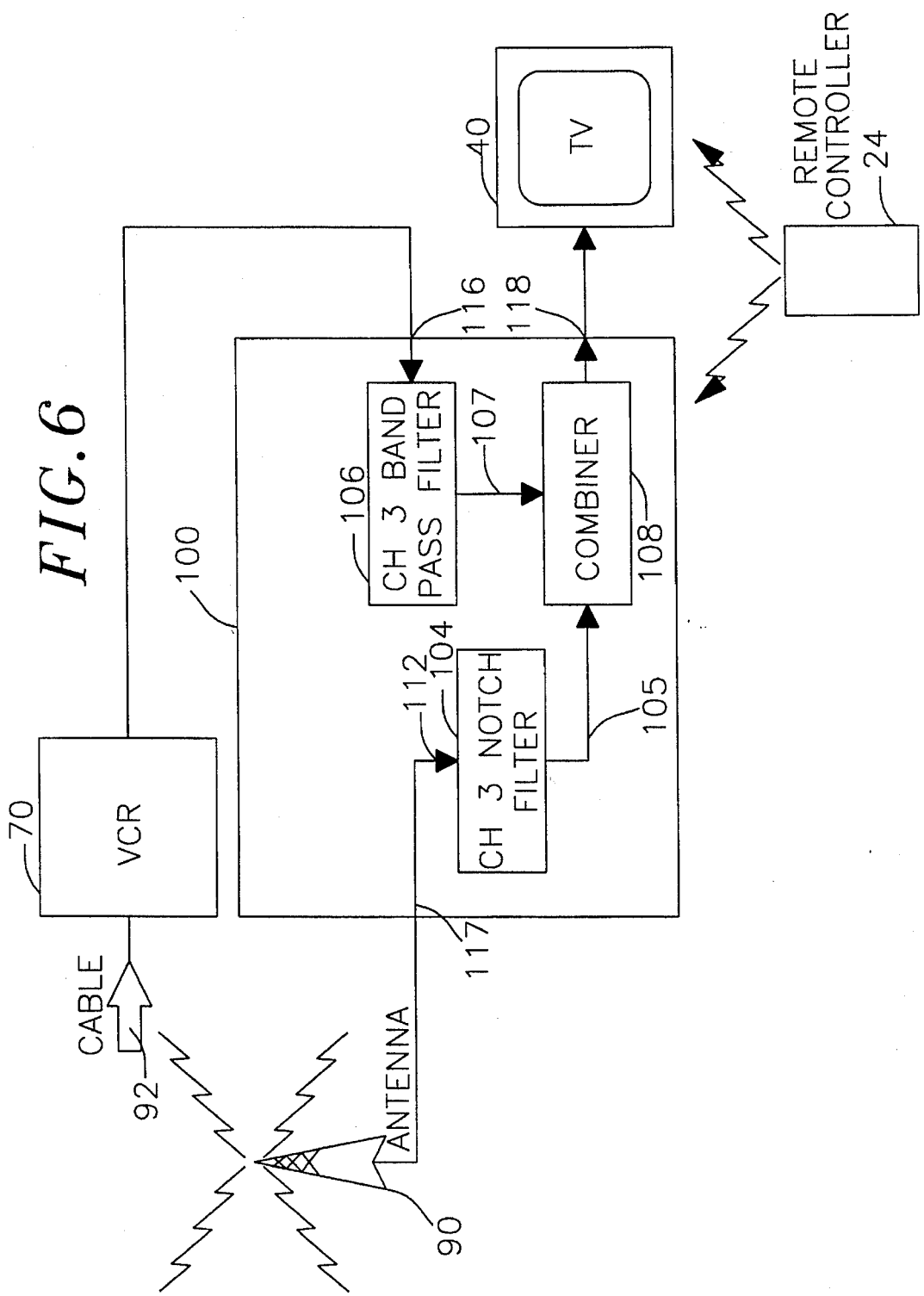
FIG. 6 illustrates another configuration for using the apparatus for connecting video components to connect an over-the-air antenna, a cable, a VCR, and a television according to the present invention.

In the configuration shown in FIG. 6 cable 92 is connected directly to VCR 70 which has an output connected to input 116. An antenna 90 is connected to input 112. The summed signal at output 118 contains all of the over-the-air channels received via antenna 90 and also a channel modulated to channel 3 by tuner 72 in VCR 70. The tuner 72 modulates one of the cable channels on cable 92 to channel 3 which is then passed via channel 3 bandpass filter 106 and combiner 108 to television 40. The remote controller 24 can be used to tune the tuner in VCR 70 to tune to any of the cable channels. While watching the cable channels the television 40 tuner is tuned to channel 3. To watch any of the over-the-air channels received via antenna 90, the television tuner is tuned to channel 1, channel 2, channel 4, channel 5, and so on.

In the configuration shown in FIG. 7 the cable 92 is attached to input 110 to splitter 102. The output 114 of splitter 102 is coupled to the input of cable box 10 which has an output connected to input 116. The output of combiner 108 is connected to television 40. In this configuration, the television 40 can be tuned to any of the channels on cable 92 except for channel 3. If a viewer wishes to view channel 3, then the remote controller 24 is used to tune cable box 10 to channel 3 and the television is tuned to channel 3. If the viewer wishes to watch a scrambled channel on cable 92, then the remote controller 24 is used to control cable box 10 to tune to the channel to be descrambled which is then descrambled by the cable box and modulated to channel 3 and sent via channel 3 bandpass filter 106 and combiner 108 to television 40 which is tuned to channel 3.

In the configuration shown in FIG. 8A, cable 92 is attached directly to cable box 10 which has an output connected to the input 116 to channel 3 bandpass filter 106. An over-the-air antenna 90 is attached to input 112 to the channel 3 notch filter 104. A television 40 is attached to the summed output 118. In this configuration a viewer can watch any of the over-the-air channels by tuning the tuner 46 in television 40. The viewer can watch all of the over-the-air channels except channel 3. Normally an over-the-air transmission does not contain a channel 3; however, as noted above it is possible that channel 4 is used as an output from a cable box and in that case the apparatus for connecting video components has a channel 4 notch filter and a channel 4 bandpass filter and a viewer tuning the tuner in TV 40 would not be able to watch channel 4 received via antenna 90. To view any of the cable channels the remote controller 24 is used to control cable box 10 to tune to a desired cable channel. The cable box then modulates the selected channel to channel 3 which is then input to the channel 3 bandpass filter 106 and sent to combiner 108. The TV is then tuned to channel 3.

The configuration shown in FIG. 8B is analogous to the configuration of FIG. 8A except that in FIG. 8B a satellite antenna 94 and satellite receiver 96 are used in place of cable 92 and cable box 10. Other than that the operation of the configuration of FIG. 8B is the same as the operation of the configuration shown in FIG. 8A. The television 40 can be tuned to all of the over-the-air channels except channel 3, and the satellite receiver can be tuned to enable the viewer to watch any satellite channel, while the television is tuned to channel 3.

Figure 9:
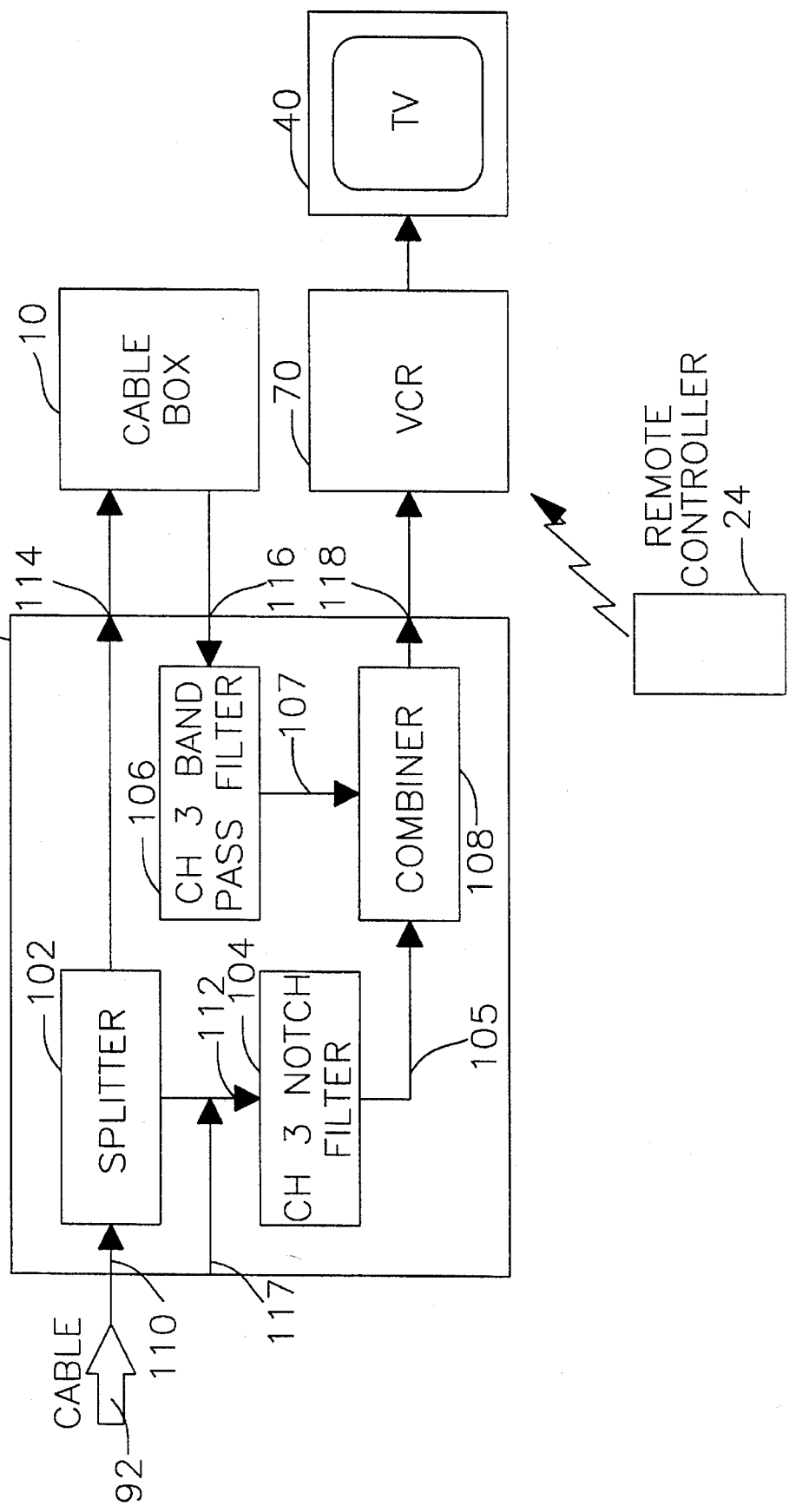
FIG. 9 is another configuration for using the apparatus for connecting video components to connect a cable, a cable box, a VCR and a television according to the present invention.

In the configuration shown in FIG. 9, cable 92 is attached to input 110 to splitter 102. The output of splitter 102 is sent to the input of cable box 10, whose output is attached to input 116. The summed output 118 is connected to the input of VCR 70 and the output of VCR 70 is connected to television 40. In this configuration the VCR 70 receives all of the channels on cable 92 except channel 3 via channel 3 notch filter 104 and combiner 108. The tuner in VCR 70 can be used to tune to any of the cable channels which can then be output from VCR 70 for viewing on TV 40, which would be tuned to channel 3. The VCR 70 can also record any of those cable channels. One advantage of this configuration is that any noise introduced by the cable box 10 is avoided. However, any scrambled channels need to be unscrambled by cable box 10. When tuning to a scrambled channel the remote controller 24 is used to tune the cable box to the proper channel and then the VCR and television are tuned to channel 3 for recording and viewing the selected channel, respectively.

In the configuration shown in FIG. 10A, cable 92 is connected directly to cable box 10 whose output is connected to input 116. An over-the-air antenna 90 is connected to input 112. The summed output 118 is sent to VCR 70 and the output of VCR 70 is sent to television 40.

In the configuration of FIG. 10A any of the channels received via antenna 90 can be recorded on VCR 70 or viewed on television 40 by tuning the tuner 72 and VCR 70 to any of the over-the-air channels except for channel 3. When the VCR tuner 72 is tuned to channel 3, then the remote controller 24 is used to tune the tuner 16 in cable box 10 to select any of the cable channels on cable 92 for recording by VCR 70 or viewing by television 40. If the VCR is being used for recording a program, then if the VCR 70 has a switch, such as switch 75 shown in FIG. 1D, then by switching switch 75 to the TV 78 position, the tuner 46 and television 40 can be used to tune to any of the over-the-air channels except channel 3 and any of the cable channels received via cable 92 can be tuned to by tuning TV 40 to channel 3 and using remote controller 24 to change channels in the cable box 10. However, if the VCR is recording a channel received via cable 92, then the viewer is restricted to viewing only the same channel as the VCR 70 is recording.

Figure 10B:
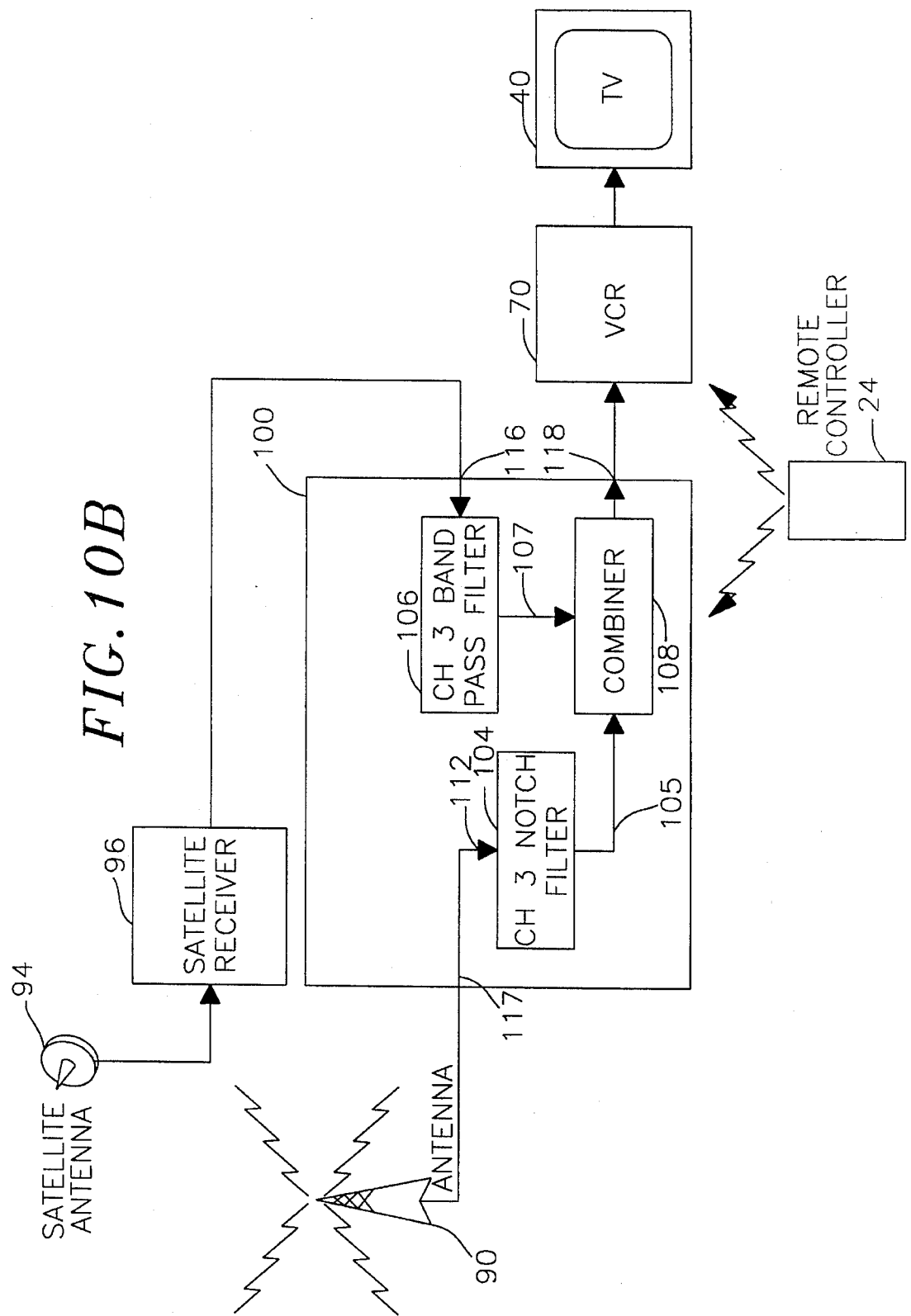

The configuration shown in FIG. 10B is analogous to the configuration shown in FIG. 10A except that the cable 92 and cable box 10 are replaced by satellite antenna 94 and satellite receiver 96. As before the VCR 70 and TV 40 can be used to record or view any of the over-the-air channels received via antenna 90 except channel 3 and the satellite receiver can be tuned to receive any of the channels received via the satellite antenna 94. The output of the satellite receiver is modulated to channel 3 and the VCR and television must be tuned to channel 3 to receive the satellite channels. Again, if VCR 70 is recording a satellite antenna then television 40 can be used to view any of the over-the-air channels received via antenna 90 and can also be used to view the channel that is being recorded by VCR 70.

Figure 11A:
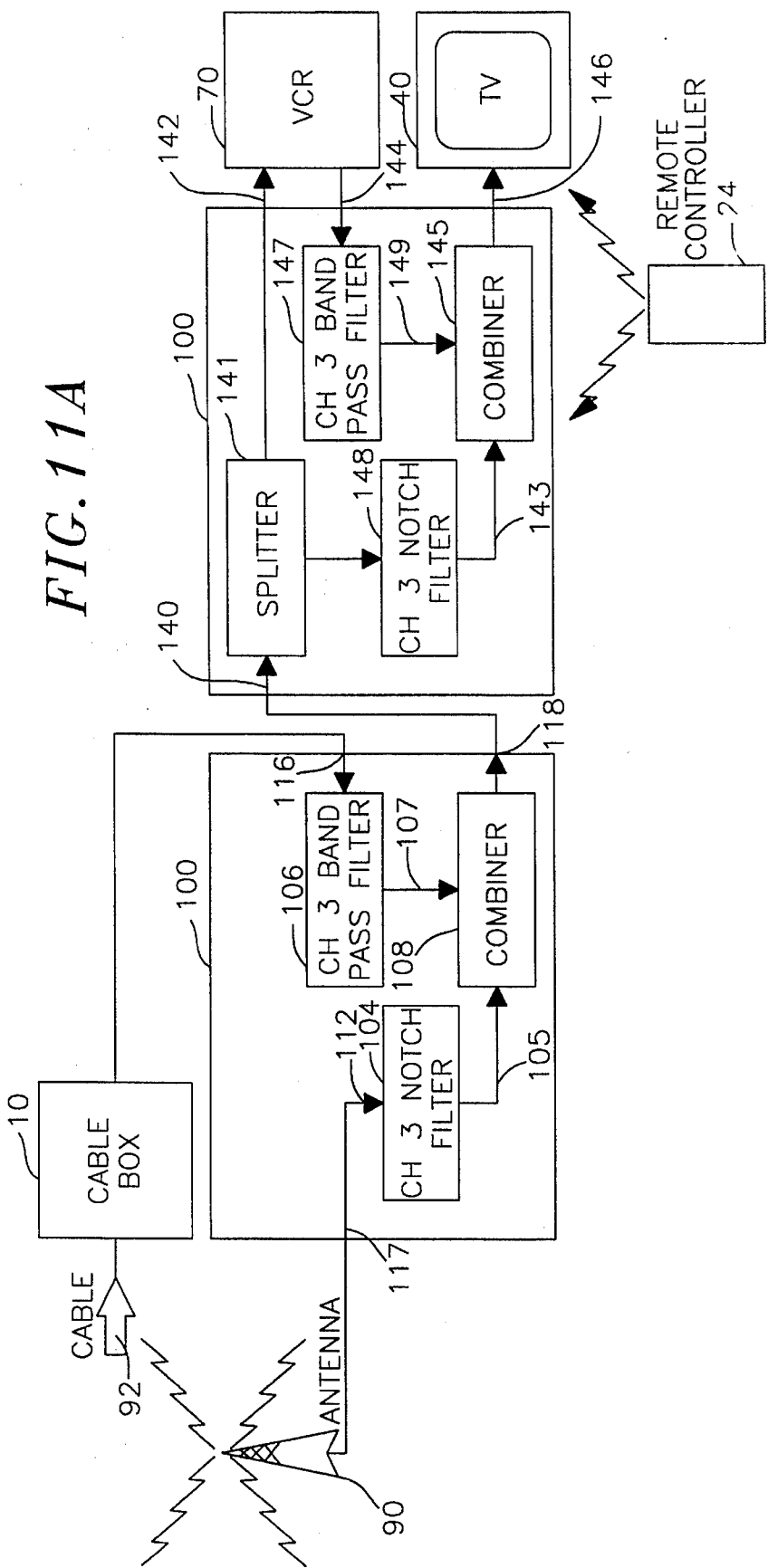
FIGS. 11A and 11B illustrate configurations for using the apparatus for connecting video components to connect an over-the-air antenna, a VCR, a television, and a cable box or a satellite receiver, respectively, according to the present invention.

In FIG. 11A two apparatus 100 for connecting video components are used. An antenna 90 is connected to input 112 of the first apparatus 100 for connecting video components. A cable box 10 has an input via cable 92 and has an output to input 116 of the first apparatus 100. The summed output 118 of the first apparatus for connecting components is sent to input 140 of the second apparatus 100 for connecting components and input to the splitter 141. The output 142 of the splitter 141 is input to VCR 70. The output of VCR 70 is connected to input 144 to the channel 3 bandpass filter 147 of the second apparatus 100 for connecting components. The summed output 146 of the second apparatus 100 for connecting video components is connected to television 40. In this configuration the summed output 118 contains all of the over-the-air channels except for channel 3 and also contains any of the cable channels tuned to by cable box 10 and modulated onto channel 3 frequencies. So at summed output 118, all of the over-the-air channels except channel 3 and all of the cable channels are available. These channels are input to splitter 141 in the second apparatus for connecting video components, via input 140. The output 142 from splitter 141 is sent to VCR 70 and the output of VCR 70 is sent via input 144 to channel 3 bandpass filter 147. Because the output of splitter 141 is sent through channel 3 notch filter 148, at output 143 the only channels that are available are the over-the-air channels that were available on output 105. However, all of the cable channels and the over-the-air channels are available on output 142 to VCR 70. Therefore, by using the tuner 72 in VCR 70 and the tuner in cable box 10, the VCR is able to record any of the cable channels and any of the over-the-air channels except for channel 3. If the VCR 70 is not recording a program then the output 142 from the splitter 141 can be sent via TV position 78 in the VCR to the VCR output which is connected to input 144 to channel 3 bandpass filter 147. If the VCR is recording a program even a cable channel program, then the switch 75 can still be used to send the VCR input directly to the VCR output. However, if the VCR 70 is recording a cable channel then the cable box has been used to modulate the channel to channel 3 in order to pass through channel 3 bandpass filter 106. Thus, in the configuration shown in FIG. 11A there is still a limitation that if the VCR 70 is recording a cable box channel then the viewer is restricted to viewing either any of the over-the-air channels or the channel being recorded by the VCR 70.

Figure 11B:
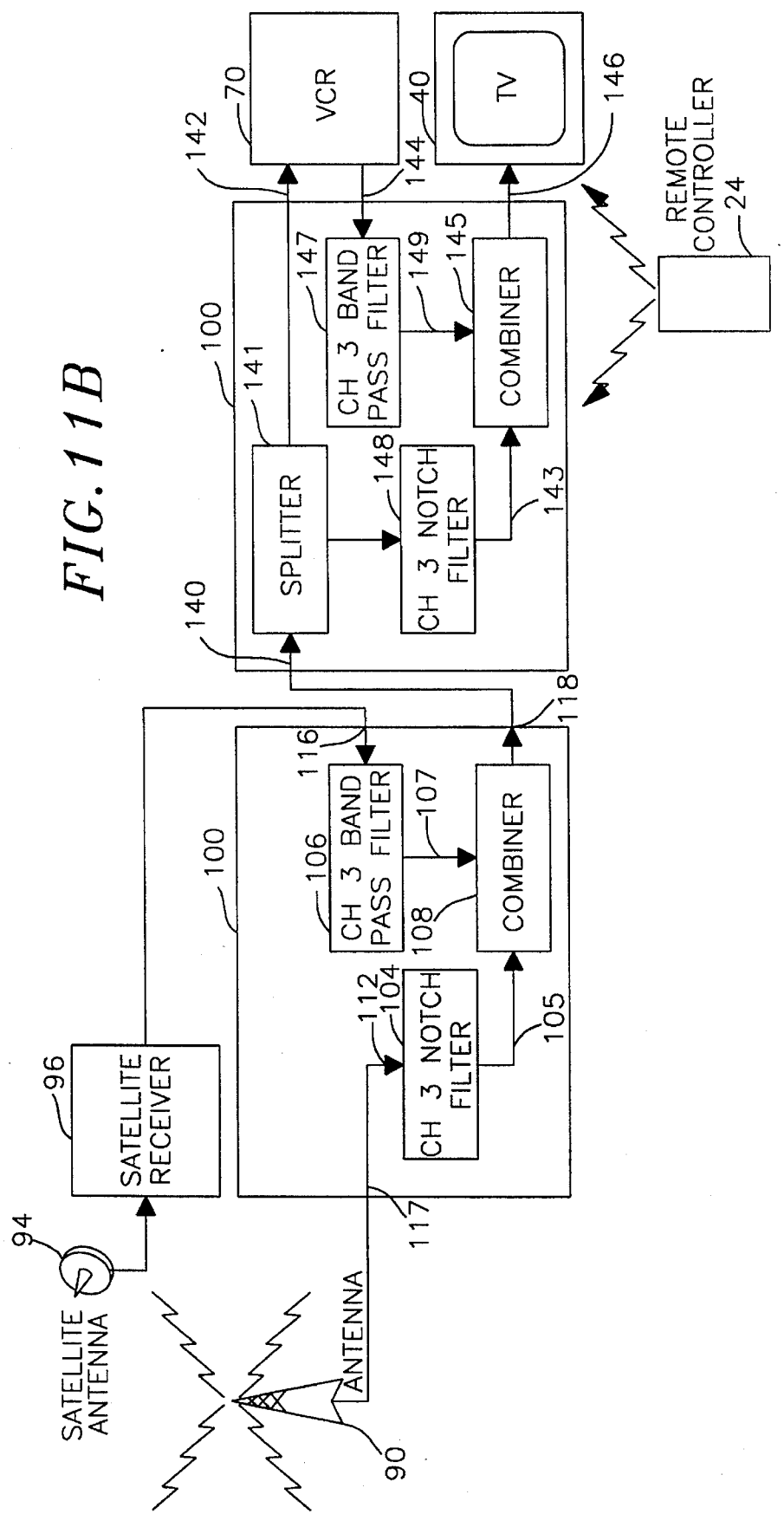

FIG. 11B is analogous to the configuration of FIG. 11A except that the satellite antenna 94 and the satellite receiver 96 are used instead of the cable 92 and the cable box 10. The operation of the configuration of FIG. 11B is therefore analogous to the operation of the configuration of FIG. 11A.

The described embodiments of the invention are only considered to be preferred and illustrative of the inventive concept, the scope of the invention is not to be restricted to such embodiments. Various and numerous other arrangements may be devised by one skilled in the art without departing from the spirit and scope of this invention.

It is therefore intended by the appended claims to cover any and all such applications, modifications and embodiments within the scope of the present invention.

What is claimed is:

1. An apparatus for connecting video components, the apparatus comprising:
   means for notch filtering frequencies of a first channel from a first video source, the first video source having a plurality of channels, to form a notch filter output having each of the plurality of channels except the frequencies of the first channel;
   means for bandpass filtering a second video source to pass only frequencies in a second channel in the second video source having the same frequencies as the frequencies of the first channel to form a bandpass filter output; and
   means for summing the notch filter output and the bandpass filter output to form a summed output.

2. The apparatus of claim 1 further comprising:
   means for signal splitting having a first input and a first and second output, the second output coupled to and providing the first video source into the means for notch filtering.

3. The apparatus of claim 1 wherein:
   the first video source is coupled to an over-the-air antenna; and
   the second video source is coupled to a video cassette recorder.

4. The apparatus of claim 3 wherein a television input is coupled to the summed output.

5. The apparatus of claim 1 wherein:
   the first video source is coupled to an over-the-air antenna; and
   the second video source is coupled to a cable box.

6. The apparatus of claim 5 wherein a television input is coupled to the summed output.

7. The apparatus of claim 5 wherein a video cassette recorder input is coupled to the summed output.

8. The apparatus of claim 1 wherein:
   the first video source is coupled to an over-the-air antenna; and
   the second video source is coupled to a satellite receiver.

9. The apparatus of claim 8 wherein a television input is coupled to the summed output.

10. The apparatus of claim 8 wherein a video cassette recorder input is coupled to the summed output.

11. The apparatus of claim 2 wherein:
    the first input is coupled to an over-the-air antenna;
    the first output is coupled to a video cassette recorder input;
    a video cassette recorder output is coupled to and provides the second video source into the means for bandpass filtering; and
    the summed output is coupled to a television input.

12. The apparatus of claim 2 wherein:
    the first input is coupled to a television cable source;
    the first output is coupled to a video cassette recorder input;
    a video cassette recorder output is coupled to and provides the second video source into the means for bandpass filtering; and
    the summed output is coupled to a television input.

13. The apparatus of claim 2 wherein:
    the first input is coupled to a television cable source;
    the first output is coupled to a cable box input;
    a cable box output is coupled to and provides the second video source into the means for bandpass filtering; and
    the summed output is coupled to a television input.

14. The apparatus of claim 2 wherein:
    the first input is coupled to a television cable source;
    the first output is coupled to a cable box input;
    a cable box output is coupled to and provides the second video source into the means for bandpass filtering; and
    the summed output is coupled to a video cassette recorder.

15. An apparatus for connecting video components, the apparatus comprising:
    a first means for notch filtering frequencies of a first channel from a first video source, the first video source having a plurality of channels, to form a first notch filter output having each of the plurality of channels except the frequencies of the first channel;
    a first means for bandpass filtering a second video source to pass only frequencies in a second channel in the second video source having the same frequencies as the frequencies of the first channel to form a first bandpass filter output;
    a first means for summing the first notch filter output and the first bandpass filter output to form a first summed output;
    means for signal splitting having a first input coupled to the first summed output and having a first and second output;
    a second means for notch filtering frequencies coupled to the second output, the second output having a plurality of channels, to form a second notch filter output having each of the plurality of channels except the frequencies of a third channel;
    a second means for bandpass filtering a fourth video source to pass only frequencies in a fourth channel in the fourth video source having the same frequencies as the frequencies of the third channel to form a second bandpass filter output; and
    a second means for summing the second notch filter output and the second bandpass filter output to form a second summed output.

16. The apparatus of claim 15 wherein:
    the first video source is coupled to an over-the-air antenna;

the second video source is coupled to a cable box output;

the first output is coupled to a video cassette recorder input;

the fourth video source is coupled to a video cassette recorder output; and the second summed output is coupled to a television input.

17. The apparatus of claim 15 wherein:

the first video source is coupled to an over-the-air antenna;

the second video source is coupled to a satellite receiver output;

the first output is coupled to a video cassette recorder input;

the fourth video source is coupled to a video cassette recorder output; and the second summed output is coupled to a television input.

18. A method for connecting video component signals, the method comprising the steps of:

notch filtering frequencies of a first channel from a first video source, the first video source having a plurality of channels, to form a notch filter output having each of the plurality of channels except the frequencies of the first channel;

bandpass filtering a second video source to pass only frequencies in a second channel in the second video source having the same frequencies as the frequencies of the first channel to form a bandpass filter output; and summing the notch filter output and the bandpass filter output to form a summed output.

19. The method of claim 18 further comprising the step of:

splitting a first input signal to provide a first and second output, the second output coupled the first video source and being isolated from the first output.

20. An apparatus for combining multiple video sources, the apparatus comprising:

first means for receiving a signal from a first video source, the first video source having a plurality of channels;

second means for receiving a signal from a second video source;

means for notch filtering frequencies of a first channel coupled to the first means for receiving a signal from the first video source, to form a notch filter output having each of the plurality of channels except the frequencies of the first channel;

means for bandpass filtering coupled to the second means for receiving a signal from the second video source to form a bandpass filter output; wherein the bandpass filter output passes frequencies in a second video source having the same frequencies as the frequencies of the first channel; and means for summing the notch filter output and the bandpass filter output to form a summed output.

21. The apparatus of claim 20 wherein:

the first video source is coupled to an over the air antenna; and the second video source is coupled to a video cassette recorder, a cable box, or a satellite receiver.

22. The apparatus of claim 20 wherein:

the first video source is coupled to a satellite receiver; and the second video source is coupled to a video cassette recorder or a cable box.

23. The apparatus of claim 21 wherein the summed output is coupled to a television input.

24. The apparatus of claim 22 wherein the summed output is coupled to a television input.

25. The apparatus of claim 21 wherein the summed output is coupled to a video cassette recorder input.

26. The apparatus of claim 22 wherein the summed output is coupled to a video cassette recorder input.

27. A method for combining multiple video sources, the method comprising the steps of:

receiving a signal from a first video source, the first video source having a plurality of channels;

receiving a signal from a second video source;

notch filtering frequencies of a first channel from the first video source to form a notch filter output having each of the plurality of channels except the frequencies of the first channel;

bandpass filtering the second video source to pass only frequencies in a second channel in the second video source having the same frequencies as the frequencies of the first channel to form a bandpass filter output; and summing the notch filter output and the bandpass filter output to form a summed output.

* * * * *